United States Patent [19]
Damkjær

[11] Patent Number: 5,482,156
[45] Date of Patent: Jan. 9, 1996

[54] CHAIN LINK WITH LOCKING DEVICE FOR CONVEYOR CHAINS AND CONVEYOR BELTS

[75] Inventor: Poul E. Damkjær, Vejle Øst, Denmark

[73] Assignee: Maskinfabrikken Baeltix A/S, Vejle Ost, Denmark

[21] Appl. No.: 332,088

[22] Filed: Nov. 1, 1994

[30] Foreign Application Priority Data

Nov. 5, 1993 [DK] Denmark ................... 1257/93

[51] Int. Cl.⁶ ............................................. B65G 17/06
[52] U.S. Cl. ............................................. 198/853
[58] Field of Search ........................... 198/850, 853

[56] References Cited

U.S. PATENT DOCUMENTS

| | | | |
|---|---|---|---|
| 4,953,693 | 9/1990 | Draebel | 198/853 |
| 5,058,732 | 10/1991 | Lapeyre | 198/853 X |
| 5,217,110 | 6/1993 | Spangler et al. | 198/853 X |
| 5,335,768 | 8/1994 | Schladweiler | 198/853 |

FOREIGN PATENT DOCUMENTS

| | | | |
|---|---|---|---|
| 0206755 | 5/1955 | Australia | 198/853 |
| 3913077 | 11/1989 | Germany | 198/853 |
| 2130162 | 5/1984 | United Kingdom | 198/853 |

*Primary Examiner*—James R. Bidwell
*Attorney, Agent, or Firm*—Antonelli, Terry, Stout & Kraus

[57] ABSTRACT

Chain link made of plastic having at least one hinge eye (2, 2') with a transverse shaft bore (3) and adapted to be interconnected in a number to form a conveyor chain or a conveyor belt in that adjacent links are interconnected in a hinge-like manner by a shaft or a pivot and where the chain link comprises a locking device (4) formed integrally with the hinge eye (2') of the chain link for positionally securing the lateral movement of the shaft.

21 Claims, 2 Drawing Sheets

CHAIN LINK WITH LOCKING DEVICE FOR CONVEYOR CHAINS AND CONVEYOR BELTS

STATE OF THE ART

The invention generally relates to a chain link for conveyor chains or conveyor belts.

Applicant's own Danish patent no. 159,544 (=U.S. Pat. No. 5,000,312) describes injection moulded plastic hinge chain links with the lateral movement of a shaft or a pivot being limited by inserting a locking dowel into an undercut groove in the outer edge of the chain link.

A corresponding technique is known from U.S. Pat. No. 4,832,187 where a split and thus resilient locking device is used, or from U.S. Pat. No. 3,726,569 where a resilient plug or a cross-bolt is used.

These structures are all disadvantageous in that additional parts are required for preventing the lateral movement of a shaft or a pivot and these parts will often have to be manufactured with comparatively small tolerances in order to remain fixed in the chain link. These structures therefore become complicated and costly, and it is moreover known that chain link conveyors based on these principles may be exposed to operational stops if merely a single locking device or locking plug is missing in a single chain link. Furthermore, the known structures suffer from various mechanical weaknesses which may result in reduced strength in the chain links. Moreover, the known structures complicate the assembly of the individual chain links for a conveyor chain or conveyor belt and the assembly may be difficult or impossible to automate.

Additionally, there is known a structure made by the firm Intralox of the United States where the outermost hinge eye in the outermost chain links is designed with an integral, resilient device mounted externally on the outwardly facing side of the chain link. This eliminates some of the problems with loose locking devices but instead many other weaknesses by such a structure will be encountered. The resilient device is mounted at the outer end of the chain link and may therefore easily break off when getting into contact with other machine parts, for example the side edge of the track, and damaged chain links must therefore be replaced at once. This structure moreover requires several different types of chain links if they are to be assembled side by side for forming a conveyor belt, which results in increased production costs, storage expenses etc. Finally, it is probable that chain link conveyors or chain link belts of this nature may have reduced wearability in the edge areas.

SUMMARY OF THE INVENTION

The chain link according to the invention has benefits without any drawbacks. No additional parts will be required since the locking device forms an integral part of the chain link, and full wearability and tensile strength are obtained in the edge area by the side edge of the chain since the locking device is arranged at a distance thereof.

When no detached parts are required for blocking the lateral movement of the pivot or the shaft, reduced production and assembly costs are obtained.

The locking device will not come off the chain link by vigorous cleaning, such as high-pressure washing, and there will be no need for looking for lost locking devices.

This design of the locking device also permits chain link structures which can be completely cleaned which is very important in connection with conveyors for foodstuffs etc. Moreover, the locking device itself is situated below the upper side as well as the lower side of the chain link and within the outer side so that the locking device will always be well protected.

Since no additional parts are required for locking the shaft, there are no extra production and assembly costs since all chain links or chain sections, irrespective of width, may have an integral locking device, and assembling and locking may be automated in connection with the assembling of the conveyor belt. Should a need arise for removing a shaft or a pivot, this is quite simply done by releasing the locking device from the side through the bore in the hinge eye or from the lower side of the chain link, and the release may be made by means of a very simple tool, such as a small screwdriver.

Finally, it is highly advantageous that the locking device principle according to the invention may be applied in any type of or any design of chain links which may be injection moulded in plastic so that the application of the integral locking device principle according to the invention is not in any manner limited to a definite type or definite types of chain links.

By designing the chain link according to the invention, there is achieved an advantageous positioning of the locking device so that it can be displaced or bent in such a manner that the transverse bore for shafts of the chain link is diminished or closed preventing lateral displacement of the shaft.

By designing the chain link according to the invention, the locking device will get the desired properties as regards bending thereof so that it can be positioned as desired by locking or releasing thereof.

By further designing the chain link according to the invention, it is possible to retain the free end of the locking device in one definite position until the locking device is to be applied for locking. This is an important advantage since not all locking devices in a conveyor belt are in use, but will nevertheless be ready for use, if required. An additional advantage is that the free end of the locking device will not vibrate since it is retained in its position.

By designing the chain link according to the invention as the locking device will not be overloaded when activated since the pin or the bridge will limit the bending of the device.

By further designing the chain link according to the invention as disclosed in the characterising parts of claims 6, it is possible to position each locking device in the position of a current requirement and to ensure that the locking device retains the position in which it is arranged despite shocks, vibrations or other mechanical stresses.

Usually, the chain link according to the invention will be completely free with regard to the placing of a chain link in a chain link belt in that each chain link or each chain link section, irrespective of width, has an integral locking device at either side, ready for use.

BRIEF DESCRIPTION OF THE DRAWINGS

An embodiment of a chain link according to the invention is shown in the drawings and will be explained further in the following description, wherein.

DESCRIPTION OF THE PREFERRED EMBODIMENTS

Figure 1:
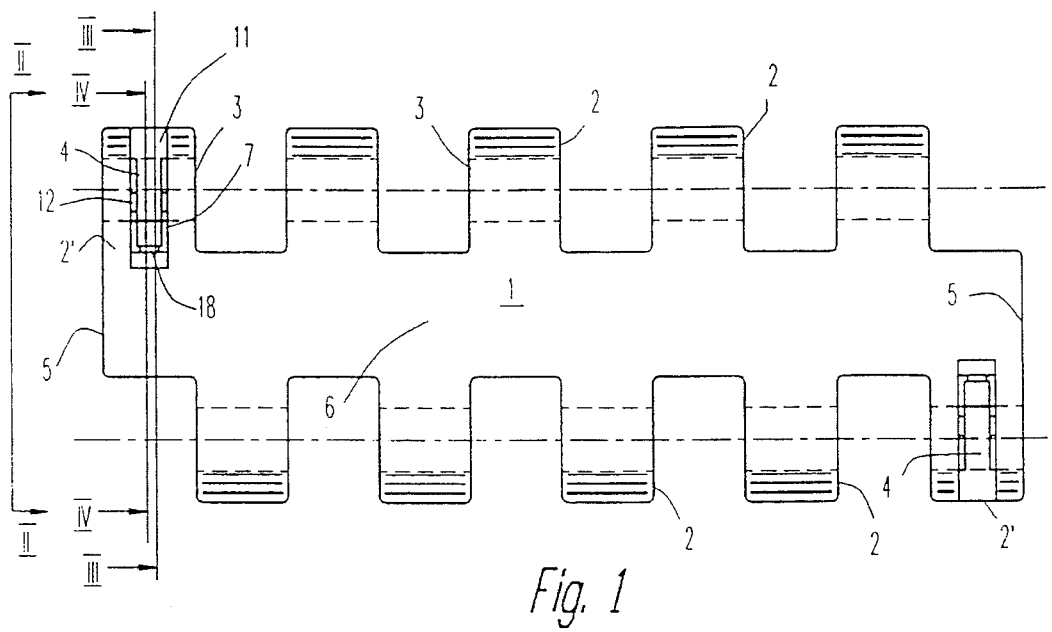
FIG. 1 is a top view of an example of a chain link with an integral locking device according to the invention.

The drawings shows an example of a chain link 1 for a chain link conveyor or for assembling a chain link conveyor with a plurality of adjacent chain links across the width.

Each chain link 1 comprises a number of hinge eyes 2, 2' at either side of a central area or an intermediate part 6. The hinge eyes 2, 2' are offset relative to each other in a known manner such that, as shown in FIG. 4, they can be interconnected by means of a shaft or a pivot 20 through the bores 3 of the hinge eyes.

The invention relates to the design of a stop device 4 within an aperture 7 in a hinge eye 2' and it is therefore of no essential importance to the invention how the chain link is otherwise designed since the new stop device according to the invention can be used in connection with any type of plastic chain link, ie. known as well as new plastic chain links.

The stop device 4 is integrally moulded with the chain link, ie. the stop device forms an integral part of the chain link since it is positioned within an aperture preferably a through-going aperture which is transverse to the bores 3 in the hinge eyes of the chain links. The transverse hole 7 is through-going from the upper side of the chain link to the lower side thereof, but otherwise is arranged in such a manner that no impairment in strength of the hinge eye will occur. In the example shown in FIG. 4, there is a transverse hole 7 in the outer hinge eye 2' at either side of the chain link 1. The transverse hole or the aperture 7 is preferably arranged in the center of the hinge eye 2' such that it will be placed at a certain distance from the outer side or outer edge 5 of the chain link, which outer side or outer edge therefore becomes solid and unbroken, as shown in FIG. 2.

Figures 2, 3, 4:
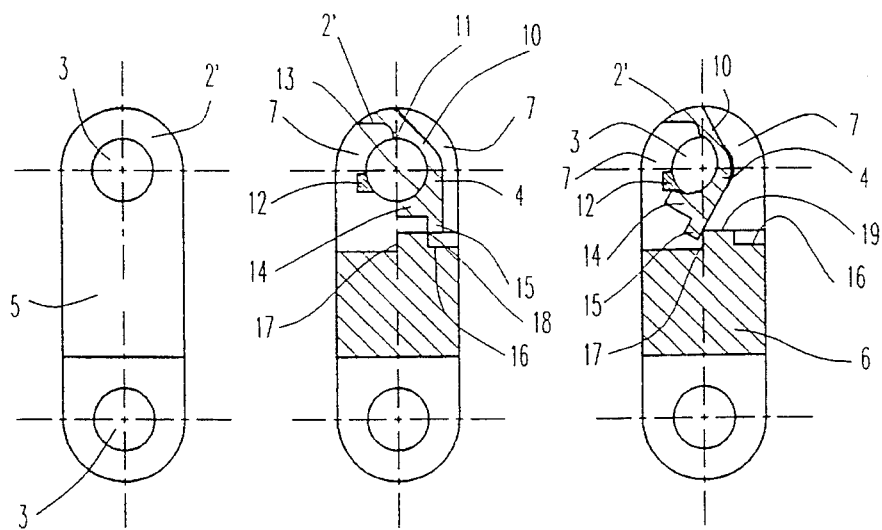
FIG. 2 is a side view in the direction II—II of the chain link in FIG. 1.
FIG. 3 is a plane section of the chain link in FIG. 1 along the line III—III and showing a non-activated locking device.
FIG. 4 is the same as FIG. 3, but with an activated locking device.

FIGS. 3 and 4 show a plane section of the locking device 4 in FIG. 1 in its released (FIG. 3) and in its locked (FIG. 4) position, respectively.

The locking device 4 forms an integral part of the part 11 of the hinge eye 2', ie. the outwardly facing part of the hinge eye. There is of course nothing to prevent the locking device from being turned if this should prove appropriate for other chain link structures. The passage between the part 11 and the stop device 4 itself comprises a section 10 of the stop device of limited thickness such that the locking device is flexible in this section. The device 4 moreover has a curved or arched area 13 which, as shown, corresponds to the shape of the shaft bore 3.

The device 4 also has a projection 15 having a thin film-like section 18 integral with the chain link itself, and a projection 19 also integral with the chain link within the aperture 7 as shown in FIG. 4.

The locking device 4 is thus via the flexible section 10 integral with the chain link part 11 to one side and integral with the central part 6 of the chain link to the other side via the thin section 18. The thin or film-like section 18 is a so-called break area which is broken on mechanical stress to position the locking device as illustrated in FIG. 4.

The projection 19 within the aperture 7 is designed with an offset 16 and 17 at either side such that, when the thin section 18 is broken, there will be two stable positions for the device 4, shown in FIG. 3 and FIG. 4, respectively. When the locking device 4 is to be moved from the position shown in FIG. 3 to the position shown in FIG. 4, the thin section 18 will be broken the first time this happens. In order not to deform the locking device 4 too much, there may be arranged a stop or a stop bridge 12 opposite the device 4 for limiting the movement of the device, as shown in FIG. 4. The stop or the stop bridge 12 is also moulded integrally with the chain link.

In the position shown in FIG. 4, ie. where the device is locked and blocks the passage of a shaft through the bore 3, the device is stuck between the bridge 12 at one side and the one edge 17 of the projection 19 at the other side such that the locking device will not vibrate in operation.

In case one or several locking devices 4 are not to be used, for example because a chain link or a chain link section is placed in the middle of a conveyor belt built up by a number of chain link sections across the width, the locking device will not be activated from the position as illustrated in FIG. 3. Because of the film connection 18 such non-activated locking devices will also be firmly secured at either end of the device and will therefore not vibrate either in operation.

Figure 5:
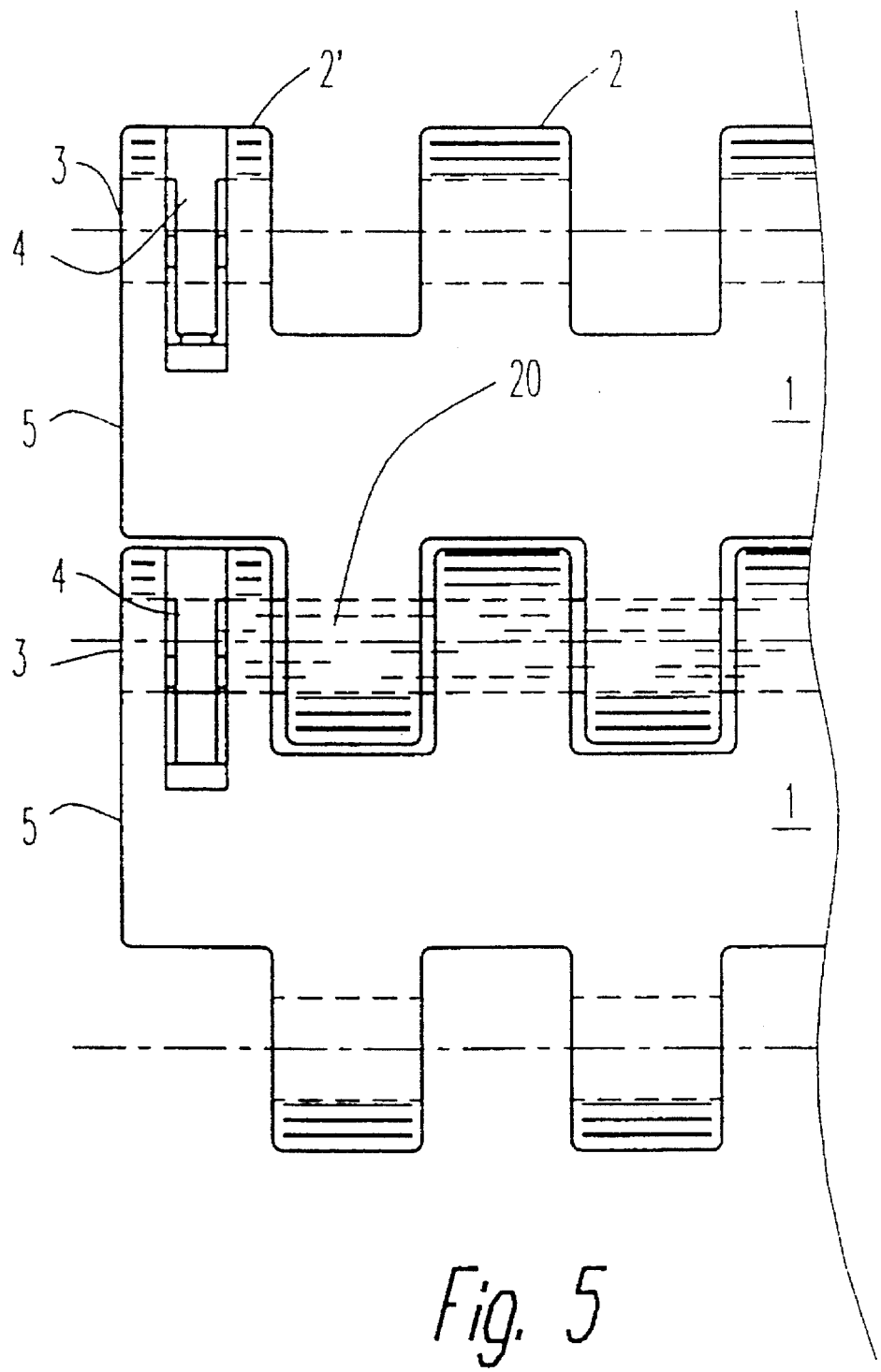
FIG. 5 is a section of two chain links in a chain link conveyor or a chain link belt and where the two chain links are interconnected by a shaft.

In case a chain link is to be replaced and/or a pivot or a shaft 20 illustrated in FIG. 5 is to be removed, the device may simply be released from the side through the bore 3, or from the bottom through the aperture 7 by exerting a slight pressure on the middle of the device, for example by means of a small screwdriver. The pivot will then be free since the locking device, as shown in FIG. 3, is then clear of the bore 3 and thus makes way for passage of a pivot or shaft 20. In FIG. 5 the locking device 4 situated at the end of the shaft 20 is incidentally shown in its activated position as in FIG. 4 and with a broken film connection.

In the embodiment of the locking device 4 shown in the drawings, the locking device only partly covers the opening in the transverse shaft bore 3 as shown in FIG. 4. But in practice this has proved fully satisfactory for any type of chain link conveyor or conveyor belt built up by chain links such that the shaft or the pivot 20 as shown in FIG. 5, will always be firmly secured behind the locking device.

I claim:

1. A plastic chain link comprising:

a chain link having opposed sides with each side having at least one hinge eye having a transverse bore for receiving a shaft to attach the link to an adjacent link to form a chain; and wherein each side of the link has at least one shaft stop within an aperture extending into alignment with the transverse bore of at least one outboard hinge eye; and each shaft stop comprises a flexible section which is bendable from an initial position outside of alignment with any part of the bore of the outboard hinge eye to a position partially in alignment with the bore of the outboard hinge eye to prevent axial movement of a shaft through the bore of the outboard hinge eye.

2. A plastic chain link in accordance with claim 1 wherein the flexible section comprises:

a first end which is permanently attached to the link about which the flexible section bends from outside of alignment with any part of the bore of the outboard hinge eye to the position partially in alignment with the bore of the outboard hinge eye and a second end which is attached to the link with a breakable connection which is broken during an initial movement of the shaft stop from outside alignment with any part of the bore of the outboard hinge eye to the position partially in alignment with the bore of the outboard hinge eye.

3. A plastic chain link in accordance with claim 1 further comprising:

a stop formed integrally with the chain link for limiting movement of the flexible section into the position partially in alignment with the bore of the outboard hinge eye.

4. A plastic chain link in accordance with claim 2 further comprising:

a stop formed integrally with the chain link for limiting movement of the flexible section into the position partially in alignment with the bore of the outboard hinge eye.

5. A plastic chain link in accordance with claim 2 wherein:

the second end comprises a projection having a width less than a base of the second end from which the projection extends.

6. A plastic chain link in accordance with claim 4 wherein:

the second end comprises a projection having a width less than a base of the second end from which the projection extends.

7. A plastic chain in accordance with claim 6 wherein:

the breakable connection of the second end is formed as part of the projection.

8. A plastic chain link in accordance with claim 5 wherein:

the aperture contains another projection engaging the projection of the second end when the shaft stop is located partially within alignment with the bore of the outboard hinge eye.

9. A plastic chain link in accordance with claim 6 wherein:

the aperture contains another projection engaging the projection of the second end when the shaft stop is located partially within alignment with the bore of the outboard hinge eye.

10. A plastic chain link in accordance with claim 8 wherein:

the stop is positionable in two positions respectively facing opposed sides of the another projection.

11. A plastic chain link in accordance with claim 9 wherein:

the stop is positionable in two positions respectively facing opposed sides of the another projection.

12. A plastic chain link in accordance with claim 2 wherein:

each side of the chain link has a shaft stop within an outboard hinge eye with each outboard hinge eye being located at a different end of the chain link.

13. A plastic chain link in accordance with claim 3 wherein:

each side of the chain link has a shaft stop within an outboard hinge eye with each outboard hinge eye being located at a different end of the chain link.

14. A plastic chain link in accordance with claim 4 wherein:

each side of the chain link has a shaft stop within an outboard hinge eye with each outboard hinge eye being located at a different end of the chain link.

15. A plastic chain link in accordance with claim 5 wherein:

each side of the chain link has a shaft stop within an outboard hinge eye with each outboard hinge eye being located at a different end of the chain link.

16. A plastic chain link in accordance with claim 6 wherein:

each side of the chain link has a shaft stop within an outboard hinge eye With each outboard hinge eye being located at a different end of the chain link.

17. A plastic chain link in accordance with claim 7 wherein:

each side of the chain link has a shaft stop within an outboard hinge eye with each outboard hinge eye being located at a different end of the chain link.

18. A plastic chain link in accordance with claim 8 wherein:

each side of the chain link has a shaft stop within an outboard hinge eye with each outboard hinge eye being located at a different end of the chain link.

19. A plastic chain link in accordance with claim 9 wherein:

each side of the chain link has a shaft stop within an outboard hinge eye with each outboard hinge eye being located at a different end of the chain link.

20. A plastic chain link in accordance with claim 10 wherein:

each side of the chain link has a shaft stop within an outboard hinge eye with each outboard hinge eye being located at a different end of the chain link.

21. A plastic chain link in accordance with claim 11 wherein:

each side of the chain link has a shaft stop within an outboard hinge eye with each outboard hinge eye being located at a different end of the chain link.

\* \* \* \* \*